(12) United States Patent
Li et al.

(10) Patent No.: US 9,401,141 B2
(45) Date of Patent: Jul. 26, 2016

(54) COMPUTER SYSTEM HAVING VOICE-CONTROL FUNCTION AND VOICE-CONTROL METHOD

(71) Applicant: VIA TECHNOLOGIES, INC., New Taipei City (TW)

(72) Inventors: XinXi Li, Beijing (CN); Xiaolu Yang, Beijing (CN); Wenting Wu, Beijing (CN); Ming Li, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 287 days.

(21) Appl. No.: 14/023,689

(22) Filed: Sep. 11, 2013

(65) Prior Publication Data

US 2014/0223157 A1 Aug. 7, 2014

(30) Foreign Application Priority Data

Feb. 5, 2013 (CN) .......................... 2013 1 0050138

(51) Int. Cl.
*G10L 15/00* (2013.01)
*G06F 1/32* (2006.01)
*G06F 9/44* (2006.01)

(52) U.S. Cl.
CPC .............. *G10L 15/00* (2013.01); *G06F 1/3206* (2013.01); *G06F 1/3215* (2013.01); *G06F 1/3287* (2013.01); *G06F 9/4401* (2013.01); *Y02B 60/1282* (2013.01)

(58) Field of Classification Search
None
See application file for complete search history.

(56) References Cited

U.S. PATENT DOCUMENTS

| 6,105,142 | A | * | 8/2000 | Goff | G06F 1/3203 713/320 |
| 6,185,677 | B1 | * | 2/2001 | Nijhawan | G06F 1/26 713/100 |
| 6,397,186 | B1 | * | 5/2002 | Bush | G10L 15/26 704/272 |
| 8,725,515 | B2 | | 5/2014 | Chen et al. | |
| 2002/0116186 | A1 | * | 8/2002 | Strauss | G10L 25/78 704/233 |
| 2005/0192788 | A1 | * | 9/2005 | Hobson | G06F 1/3203 703/22 |
| 2012/0150546 | A1 | | 6/2012 | Cheng et al. | |

(Continued)

FOREIGN PATENT DOCUMENTS

| CN | 102541574 A | 7/2012 |
| TW | 201248495 A1 | 12/2012 |

*Primary Examiner* — Thomas Lee
*Assistant Examiner* — Danny Chan
(74) *Attorney, Agent, or Firm* — McClure, Qualey & Rodack, LLP

(57) ABSTRACT

The invention discloses a computer system having voice-control function. The computer system includes a voice-recognition module, a shared memory, a microcontroller, a power-management module and a central processing unit. The voice-recognition module receives an external voice signal via a microphone and determines whether the external voice signal corresponds to an operation instruction. The shared memory is used for storing shared state information. The microcontroller is used for setting the shared state information according to the operation instruction when the external voice signal corresponds to the operation instruction. The power-management module generates a power-management signal according to the shared state information in the shared memory. When the power-management module transmits the power-management signal, the central processing unit executes a processing operation corresponding to the operation instruction according to the shared state information in the shared memory.

14 Claims, 3 Drawing Sheets

(56) References Cited

U.S. PATENT DOCUMENTS

2012/0173899 A1* 7/2012 Swindell .................. G06F 1/266
  713/310

2015/0033236 A1* 1/2015 Berlin ................... G06F 9/4812
  718/102

* cited by examiner

COMPUTER SYSTEM HAVING VOICE-CONTROL FUNCTION AND VOICE-CONTROL METHOD

CROSS REFERENCE TO RELATED APPLICATIONS

This Application claims priority of China Patent Application No. 201310050138.8, filed on Feb. 5, 2013, the entirety of which is incorporated by reference herein.

BACKGROUND OF THE INVENTION

1. Field of the Invention

The invention relates to computer systems, and more particularly relates to computer systems having a voice-control function.

2. Description of the Related Art

Electronic systems normally have power management, and there are lots of standards of power management, such as the Advanced Configuration and Power Interface (ACPI) specification. The ACPI is a power-management open standard developed by Intel, Microsoft and Toshiba, and is suitable for all classes of computer systems including desktop computers, portable computers, workstations, and server machines. The purpose of the ACPI specification is to efficiently distribute power supply to each component in the computer system. It should be noted that ACPI is a power management interface shared between the software (operating system, OS) and hardware, and power management herein is OS-directed instead of BIOS-directed, which is more beneficial for manufacturers when integrating their standards with each other.

Also, with most computer systems, a user needs to operate them by direct touch. However, it is difficult for a user with disabilities to operate them. The technique of voice recognition has been under development for long time, and today the voice recognition rate is quite high. Therefore, using voice recognition to improve the operability of computer systems for users has become an important issue.

BRIEF SUMMARY OF THE INVENTION

The invention provides a computer system having a voice function, wherein the computer system comprises: a voice-recognition module, receiving an external voice signal via a microphone, and determining whether the external voice signal corresponds to an operation instruction; a shared memory, configured to store shared state information; a microcontroller, setting the shared state information according to the operation instruction when the external voice signal corresponds to the operation instruction; a power-management module, generating a power-management signal according to the shared state information in the shared memory; and a central processing unit, performing a processing operation corresponding to the operation instruction according to the shared state information in the shared memory when the power-management module issues the power-management signal.

The invention provides a voice-control method, for a computer system having a central processing unit and a power-management module, and the voice-control method comprises: receiving an external voice signal; determining whether the external voice signal corresponds to an operation instruction; setting shared state information in a shared memory according to the operation instruction when the external voice signal corresponds to the operation instruction; generating a power-management signal by the power-management module according to the shared state information in the shared memory; and performing a processing operation corresponding to the operation instruction by the central processing unit according to the shared state information in the shared memory when the power-management module generates the power-management signal.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
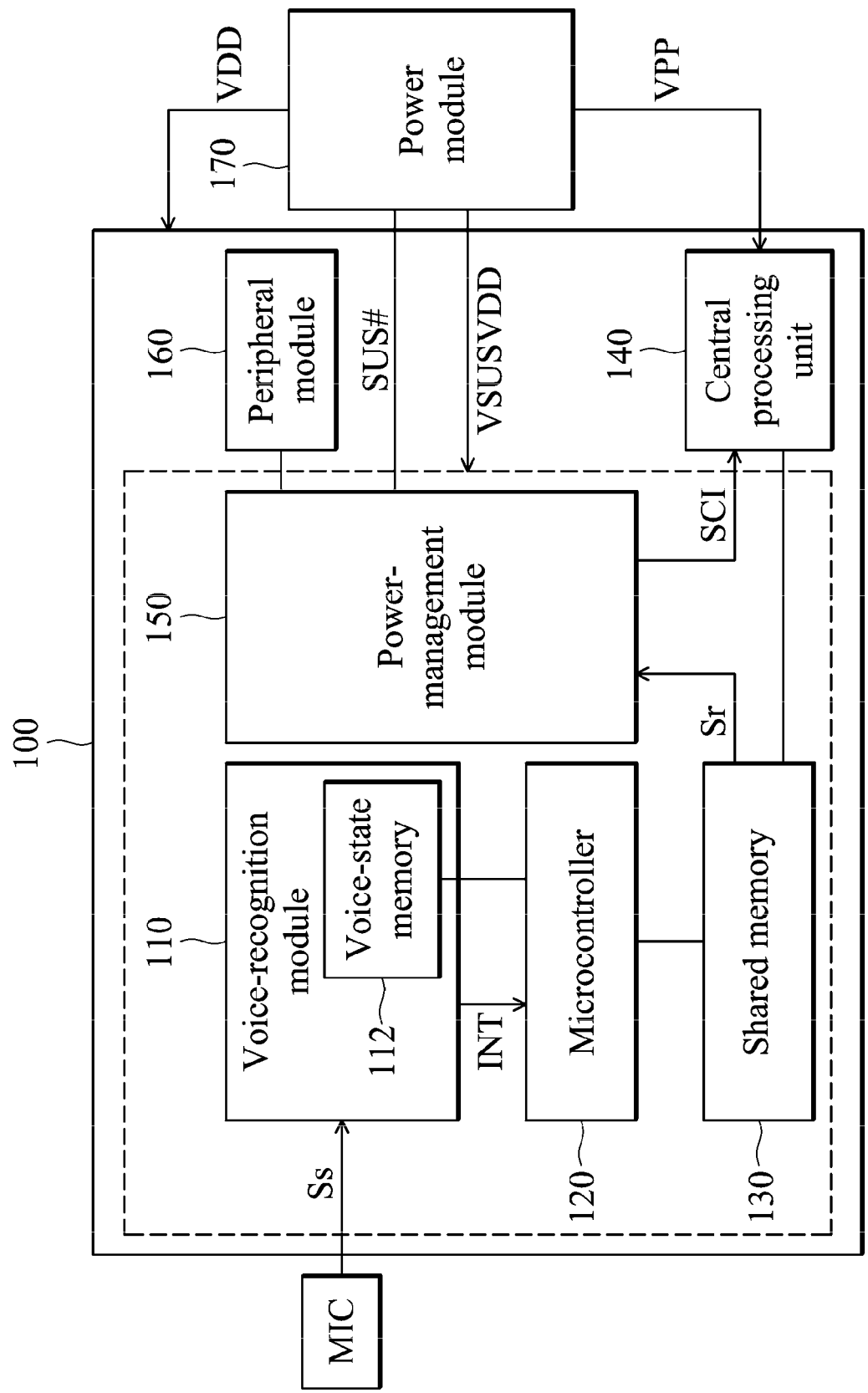
FIG. 1 is a block diagram illustrating an embodiment of a computer system.

FIG. 1 is a block diagram illustrating an embodiment of a computer system. The computer system 100 mainly comprises a voice-recognition module 110, a microcontroller 120, a shared memory 130, a central processing unit 140, a power-management module 150 and a peripheral module 160.

Also, a microphone MIC is configured to receive voice commands from the user, and to provide an external voice signal Ss to the voice-recognition module 110. The voice-recognition module 110 determines whether the external voice signal Ss corresponds to an operation instruction, for example, the voice-recognition module 110 may preset some operations (such as boot or shut-down) corresponding to some keywords. Once the voice-recognition module 110 determines the external voice signal Ss including the information of corresponding to one of these keywords, then the operation corresponding to the keyword is performed. In an embodiment, the voice-recognition module 110 further comprises a voice-state memory 112, the voice-state memory 112 is configured to store voice-state information. The voice-state information is used for indicating the corresponding operation instruction determined by the voice-recognition module 110. Specifically, when the voice-recognition module 110 determines that the external voice signal Ss corresponds to an operation instruction, the voice-recognition module 110 sets the voice-state information according to the operation instruction, and transmits an interrupt signal INT to the microcontroller 120.

When the microcontroller 120 receives the interrupt signal INT, the microcontroller 120 obtains the voice-state information stored in the voice-state memory 112, and determines the operation instruction accordingly. In the embodiment, the microcontroller 120 determines the corresponding operation instruction determined by the voice-recognition module 110 according to the interrupt signal INT and the voice-state information. In another embodiment, the voice-recognition module 110 may transmit the related information of the determined operation instruction to the microcontroller 120. Next, the microcontroller 120 sets shared state information in the shared memory 130, and the power-management module 150 generates a power-management signal SUS # according to the shared state information in the shared memory 130, wherein the power-management module 150 may be a Power Management Unit (PMU).

When the power-management module 150 issues the power-management signal SUS #, the central processing unit 140 obtains the shared state information in the shared memory 130 for determining the operation instruction, and performs the corresponding processing operation. It should be noted that shared memory 130 is a memory space accessible by the microcontroller 120 and the central processing unit 140, such as the shared memory region of the Platform Communication Channel (PCC) defined by Advanced Configuration and Power Interface (ACPI) standard.

The computer system 100 conforms to the ACPI standard, for example. And the invention is also suitable for computer system 100 conforming with other power management standards. ACPI defines the system states of the computer system 100, and the system states comprise at least a working state (S0 state), a first power state (S1 state), a second power state (S2 state), a third power state (S3 state), a fourth power state (S4 state) and a fifth power state (S5 state) as defined by the ACPI.

In an embodiment, the computer system 100 further comprises a power module 170. If the operation instruction determines which system state the computer system 100 enters, the power management module 150 generates the power management SUS# to the power module 170 according to the system state requested by the operation instruction, and the power module 170 provides different power sources to each unit of the computer system according to the power-management signal SUS#.

For example, when the operation instruction instructs the system to enter the third low power state (S3 state), the power-management signal SUS# generated by the power management module 150 instructs the power module 170 to stop providing power source VPP to the central processing unit 140, stop providing power source VDD to the peripheral module 160 and the other modules in the chipset, but to provide power source to system memory (not shown in figure), and provides power source VSUSVDD to the voice-recognition module 110, the microcontroller 120, the shared memory 130, and the power-management module 150.

When the operation instruction instructs the system to enter the fourth low power state (S4 state) or the fifth low power state (S5 state), the power-management signal SUS# generated by the power management module 150 instructs the power module 170 to stop providing power source VPP to the central processing unit 140, stops providing power source VDD to the peripheral module 160 and the other modules in the chipset, and also stops providing power source to the system memory (not shown in figure), and it only provides power source VSUSVDD to the voice-recognition module 110, the microcontroller 120, the shared memory 130, and the power-management module 150.

When the operation instruction instructs the system to enter the work state (S0 state), the power-management signal SUS# generated by the power management module 150 instructs the power module 170 to provide power source VPP to the central processing unit 140, provide power source VDD to the peripheral module 160 and the other modules in the chipset, provide power source to system memory (not shown in figure), and provide power source VSUSVDD to the voice-recognition module 110, the microcontroller 120, the shared memory 130, and the power-management module 150.

Specifically, in an embodiment, the power-management signal SUS# may comprise two sub-signals SUSB# and SUSC#. When the power module 170 receives the de-asserted sub-signals SUSB#, the power module 170 provides power source VDD and power source VPP. When the power module 170 receives the de-asserted sub-signals SUSC#, the power module 170 provides power source to system memory.

It should be noted that, in some embodiments of the invention, in order to keep the voice-control function working, the power source VSUSVDD for the voice-recognition module 110, the microcontroller 120, the shared memory 130, and the power-management module 150 should not be affected by the system state.

Also, due to the central processing unit 140 entering sleep mode in some system states, the power-management signal SUS # generated by the power-management module 150 will instruct the power module 170 to stop providing the power source VPP to the central processing unit 140. In that situation, in order for the central processing unit 140 to correctly execute the instruction later, after the microcontroller 120 sets the shared state information in the shared memory 130 according to the operation instruction, the power-management module 150 wakes the central processing unit 140 up according to the shared state information, and the power module 170 provides the power source VPP to the central processing unit 140 again. Further, the power-management module 150 transmits a system-control interrupt signal SCI to the central processing unit 140. Due to the shared memory 130 having stored the shared state information, the central processing unit 140 can determine the operation instruction to perform the corresponding operation according to the shared state information after it wakes.

In an embodiment of the invention, when the operation instruction is a sleep instruction, a wake instruction or a shut-down instruction, the power-management module 150 not only transmits the power-management signal SUS # to the power module 170 for providing the power source needed by the system state, but also transmits a system-control interrupt signal SCI to the central processing unit 140. Next, the central processing unit 140 may obtain a corresponding program code (such as, ASL code) from Basic Input/Output System (BIOS) according to the shared state information in the shared memory 130, and the central processing unit 140 performs the processing operation corresponding to the operation instruction through the obtained program code.

In another embodiment of the invention, when the operation instruction is a boot instruction, the power-management module 150 transmits the power-management signal SUS # to the power module 170 according to the shared state information, and the power module 170 provides power sources (including power source VPP, VDD and VSUSVDD) to all units of the computer system 100. Meanwhile, the power-management module 150 does not transmit the system-control interrupt signal SCI to the central processing unit 140. After the power source is provided, the central processing unit 140 can determine that the operation instruction is a boot instruction according to the shared information in the shared memory 130, and perform a boot operation accordingly. Specifically, when sub-signals SUSB# and SUSC# are both de-asserted, the power module 170 provides power sources to the central processing unit 140 and chipset (not shown in figure), such that a full power source is provided to the computer system 100. Besides, the central processing unit 140 does not receive the system-control interrupt signal SCI, so the computer system 100 can enter a boot process.

The peripheral module 160 may be Bus Masters or input/output devices, such as PCIE controller, PCI controller, HD Audio controller, SDIO and memory interface controller, keyboard/mouse controller, and USB controller, etc. However, it is not limited thereto. Also, in some embodiments, the voice-recognition module 110, the microcontroller 120, the shared memory 130, and the power-management module 150 can be integrated in a chipset, excluding the central processing unit 140. In an embodiment, the power-management module 150 not only determines which instruction the user's voice input instructs according to the shared state information in the shared memory 130, but also determines which kind of power-management signal SUS # is provided to the power module 170 according to the specific state of the peripheral module 160. For example, even if the external voice signal Ss input by the user corresponds to an operation of "sleep", the power-management module 150 still has to determine which one of the low power states S1-S5 the system should enter according to the specific state of the peripheral module 160.

The computer system of the invention can use voice commands to control the central processing unit for performing hardware operations like sleep, wake-up, shut-down, and boot. If the function of booting by voice is needed, the power source VSUSVDD provided to the voice-recognition module 110, the microcontroller 120, the shared memory 130, and the power-management module 150 must be continuously maintained. If the function of voice-control booting is not needed, a power management sub-signal SUSA # can be added in order to control the power source VSUSVDD of the power module 170. The computer system of the invention is able to use voice to control the central processing unit for running software programs, and also performing the hardware operations of boot, shut-down, sleep, and wake-up without using a physical power button.

Figure 2:
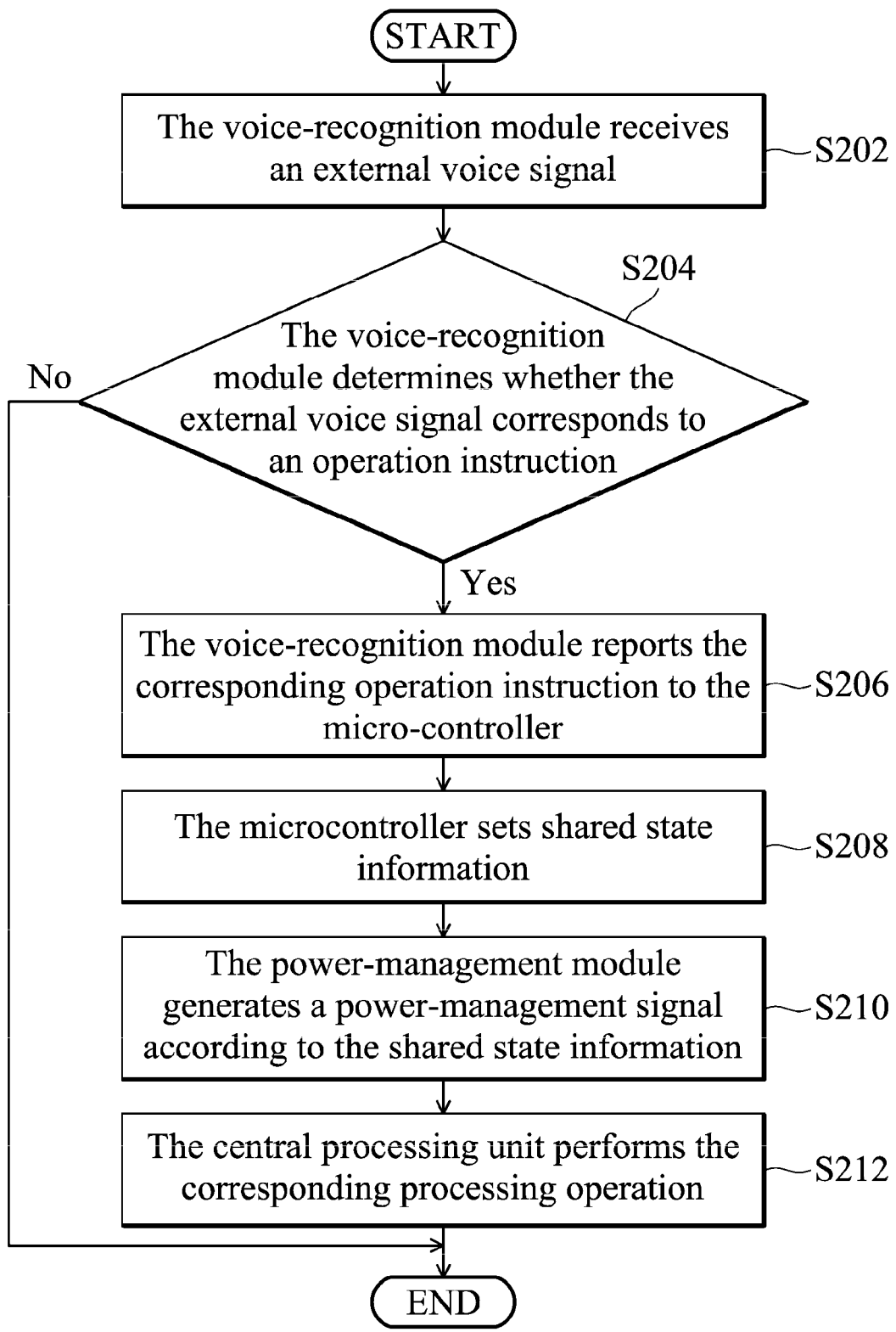
FIG. 2 is a flowchart of an embodiment of a voice-control method for the computer system.

FIG. 2 is a flowchart of an embodiment of a voice-control method for the computer system. In step S202, the voice-recognition module 110 receives an external voice signal Ss. Next, in step S204, the voice-recognition module 110 determines whether the external voice signal Ss corresponds to an operation instruction. When the external voice signal Ss corresponds to an operation instruction, the step proceeds to step S206. On the other hand, if the external voice signal Ss does not correspond to any operation instruction, no further operation is performed until a new voice signal is received.

In step S206, the voice-recognition module 110 reports the corresponding operation instruction to the microcontroller 120. In an embodiment, the voice-recognition module 110 sets the voice-state information in the voice-state memory 112, and transmits an interrupt signal INT to the microcontroller 120, in order to report the determined operation instruction to the microcontroller 120. Next, in step S208, the microcontroller 120 sets shared state information in the shared memory 130 according to the operation instruction.

In step S210, the power-management module 150 generates a power-management signal SUS # according to the shared state information in the shared memory 130. It should be noted that, in some embodiments of step S210, the power-management module 150 determines whether the operation instruction is a boot instruction according to the shared state information. When the operation instruction is a boot instruction, the power-management module 150 does not transmit the system-control interrupt signal SCI to the central processing unit 140, and the power-management module 150 merely transmits the power-management signal SUS # to the power module 170, so that the power module 170 provides full power sources to all units of the computer system 100 for performing the boot operation. In another embodiment of step S210, when the operation instruction is a sleep instruction, a wake instruction or a shut-down instruction, the power-management module 150 not only transmits the power-management signal SUS # to the power module 170 for providing the power source needed by the system state, but also transmits a system-control interrupt signal SCI to the central processing unit 140.

Finally, in step S212, the central processing unit 140 determines the operation instruction according to the shared state information in the shared memory 130, and performs the corresponding processing operation. When the operation instruction is a boot instruction, the central processing unit 140 performs the boot process operation in step S212. When the operation instruction is a sleep instruction, a wake instruction or a shut-down instruction, in step S212, the central processing unit 140 obtains a corresponding program code (such as, ASL code) from Basic Input/Output System (BIOS) according to the shared state information in the shared memory 130, and the central processing unit 140 performs the corresponding sleep, wake or shut-down operation through executing the obtained program code.

Figure 3:
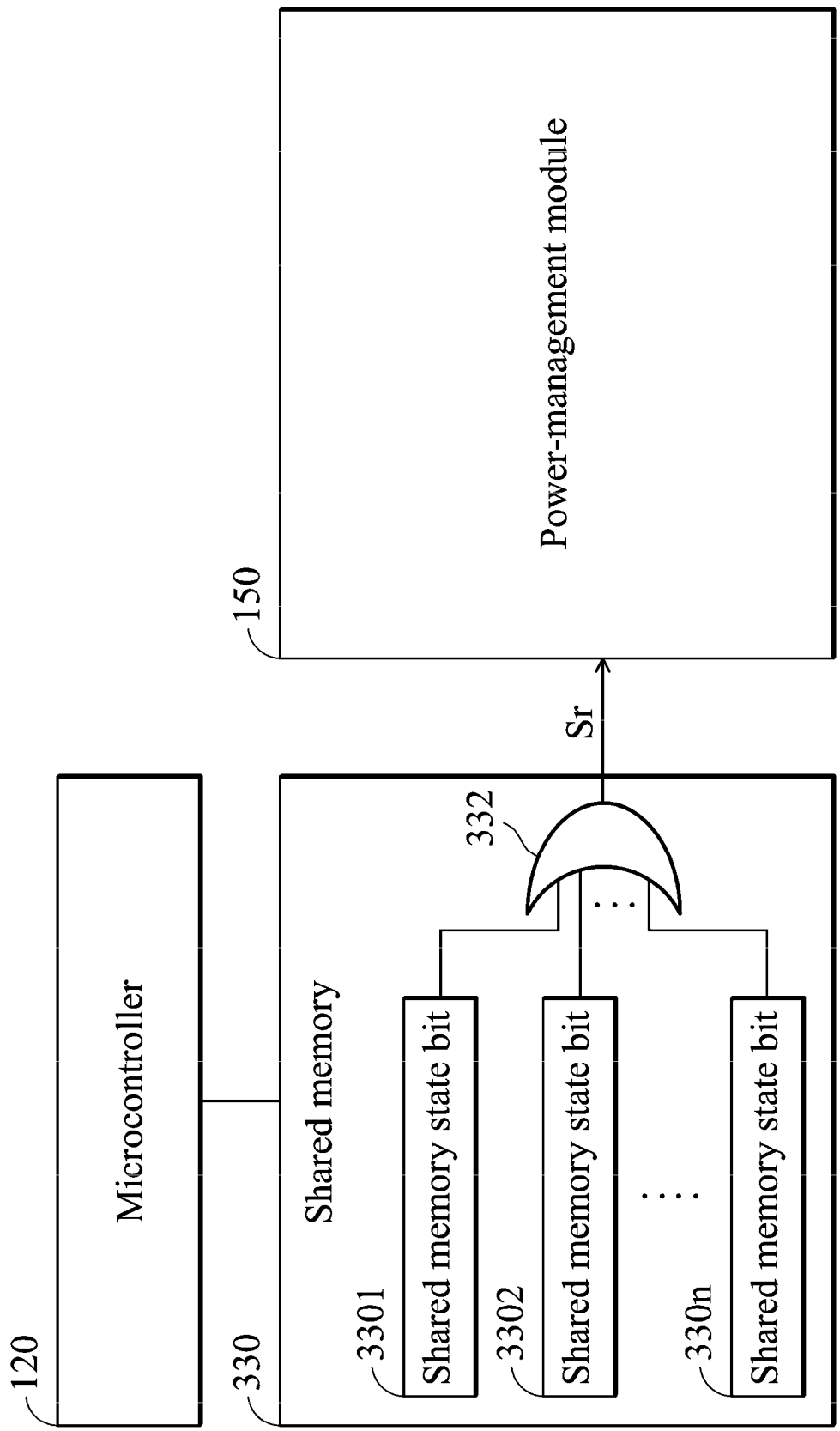
FIG. 3 is a diagram illustrating an embodiment of a shared memory.

FIG. 3 is a diagram illustrating an embodiment of shared memory. The shared memory 330 comprises multiple shared memory state bits 3301-330$n$. For example, if the shared memory state bit 3301 is set to "1", it means that the external voice signal Ss indicates "boot", and the corresponding instruction is a boot instruction. If the shared memory state bit 3302 is set to "1", it means that the external voice signal Ss indicates "shut-down", and the corresponding instruction is a shut-down instruction. Basically, the amount of shared memory state bits equals the amount of operation instructions which the voice-recognition module can recognize. In an embodiment, the shared memory 330 further comprises a logic gate circuit 332. When the shared memory state bits 3301-330$n$ use "1" for indicating valid, the logic gate circuit 332 is an OR logic. When anyone of the shared memory state bits 3301-330$n$ is set to "1", the output of the logic gate circuit 332 outputs a request signal Sr to the power-management module 150. When the power-management module 150 receives the request signal Sr, the power-management module 150 reads the shared state information recoded by the shared memory state bits 3301-330$n$ in the shared memory 330 for determining which operation instruction the user's voice input indicates. Also, when the shared memory state bits 3301-330$n$ use "0" for indicating valid, the logic gate circuit 332 is a AND logic. In another embodiment, the shared memory 330 may not have the logic gate circuit 332. Instead, the microcontroller 120 outputs a request signal Sr according to the shared state information recoded by the shared memory state bits 3301-330$n$ to instruct the power-management module 150 to read the shared memory state bits in the shared memory 330.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer system, comprising:
 a voice-recognition module, receiving an external voice signal via a microphone, and determining whether the external voice signal corresponds to one of multiple operation instructions;
 a shared memory, configured to store shared state information;

a microcontroller, setting the shared state information according to the one of the multiple operation instructions when the external voice signal corresponds to the one of the multiple operation instructions, wherein different shared state information corresponds to different operation instruction of the multiple operation instructions, wherein the microcontroller is independent from the voice-recognition module;

a power-management module, generating a power-management signal according to the shared state information in the shared memory; and a central processing unit, performing a processing operation corresponding to the one of the multiple operation instructions according to the shared state information in the shared memory when the power-management module issues the power-management signal, wherein the power-management module further generates an interrupt signal to the central processing unit, and wherein when the central processing unit receives the interrupt signal, the central processing unit performs the processing operation corresponding to the one of the multiple operation instructions according to the shared state information in the shared memory.

2. The computer system of claim 1, wherein the voice-recognition module further comprises a voice-state memory, the voice-recognition module stores voice-state information to the voice-state memory according to the one of the multiple operation instructions when the external voice signal corresponds to the one of the multiple operation instructions, and wherein the microcontroller further sets the shared state information according to the voice-state information.

3. The computer system of claim 1, wherein the shared memory is a memory space accessible by the microcontroller and the central processing unit.

4. The computer system of claim 1, further comprising:
a power module, providing different power sources to the computer system according to the power-management signal.

5. The computer system of claim 4, wherein when the one of the multiple operation instructions is a boot instruction, the power module provides a full power source to the computer system according to the power-management signal, and the central processing unit performs a boot operation according to the shared state information in the shared memory.

6. The computer system of claim 1, wherein when the one of the multiple operation instructions is a sleep instruction, a wake instruction or a shut-down instruction, the central processing unit obtains a corresponding program code from Basic Input/Output System (BIOS) according to the shared state information in the shared memory, and the central processing unit performs the processing operation corresponding to the one of the multiple operation instructions through the obtained program code.

7. The computer system of claim 6, further comprises a plurality of peripheral modules, wherein when the central processing unit reads the shared state information, the central processing unit further determines the states of the peripheral modules to obtain the program code from Basic Input/Output System (BIOS).

8. The computer system of claim 1, wherein the computer system conforms with the Advanced Configuration and Power Interface (ACPI) standard, and the system states of the computer system comprise at least a working state (S0 state), a first power state (S1 state), a second power state (S2 state), a third power state (S3 state), a fourth power state (S4 state) and a fifth power state (S5 state) as defined by the ACPI, and wherein the one of the multiple operation instructions directs the computer system to enter one of the system states.

9. A voice-control method, for a computer system having a central processing unit and a power-management module, the voice-control method comprising:
receiving an external voice signal;
determining whether the external voice signal corresponds to one of multiple operation instructions;
setting shared state information in a shared memory according to the one of the multiple operation instructions when the external voice signal corresponds to the one of the multiple operation instructions, wherein different shared state information corresponds to different operation instruction of the multiple operation instructions;
generating a power-management signal by the power-management module according to the shared state information in the shared memory;
performing a processing operation corresponding to the one of the multiple operation instructions by the central processing unit according to the shared state information in the shared memory when the power-management module generates the power-management signal;
generating an interrupt signal to the central processing unit by the power-management module; and
when the central processing unit receives the interrupt signal, performing the processing operation corresponding to the one of the multiple operation instructions by the central processing unit according to the shared state information in the shared memory.

10. The method of claim 9, further comprising:
setting voice-state information according to the one of the multiple operation instructions when the external voice signal corresponds to the one of the multiple operation instructions; and
setting the shared state information according to the voice-state information.

11. The method of claim 9, wherein the step of setting shared state information in the shared memory according to the one of the multiple operation instructions is performed by a microcontroller, and wherein the shared memory is a memory space accessible by the microcontroller and the central processing unit.

12. The method of claim 9, further comprising:
providing different power sources to the computer system according to the power-management signal.

13. The method of claim 9, further comprising:
when the one of the multiple operation instructions is a boot instruction, providing a full power source to the computer system according to the power-management signal; and
performing a boot operation by the central processing unit according to the shared state information in the shared memory.

14. The method of claim 9, further comprising:
when the one of the multiple operation instructions is a sleep instruction, a wake instruction or a shut-down instruction, obtaining a corresponding program code from Basic Input/Output System (BIOS) by the central processing unit according to the shared state information in the shared memory; and
performing the processing operation corresponding to the one of the multiple operation instructions by the central processing unit through the obtained program code.

* * * * *